(12) United States Patent
Sun (10) Patent No.: US 8,909,666 B2
(45) Date of Patent: Dec. 9, 2014

(54) DATA QUERY SYSTEM AND CONSTRUCTING METHOD THEREOF AND CORRESPONDING DATA QUERY METHOD

(75) Inventor: Ming Sun, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 264 days.

(21) Appl. No.: 13/497,702

(22) PCT Filed: Jun. 3, 2010

(86) PCT No.: PCT/CN2010/073521
§ 371 (c)(1),
(2), (4) Date: Mar. 22, 2012

(87) PCT Pub. No.: WO2011/035608
PCT Pub. Date: Mar. 31, 2011

(65) Prior Publication Data
US 2012/0226702 A1 Sep. 6, 2012

(30) Foreign Application Priority Data
Sep. 23, 2009 (CN) .......................... 2009 1 0178103

(51) Int. Cl.
G06F 17/30 (2006.01)
(52) U.S. Cl.
CPC .... G06F 17/30477 (2013.01); G06F 17/30306 (2013.01)
USPC .......................................................... 707/769
(58) Field of Classification Search
None
See application file for complete search history.

(56) References Cited

U.S. PATENT DOCUMENTS

| 7,668,740 | B1* | 2/2010 | Baggett et al. .................... 705/5 |
| 8,166,063 | B2* | 4/2012 | Andersen et al. ............. 707/770 |
| 8,239,535 | B2* | 8/2012 | Error et al. .................... 709/226 |
| 2003/0037093 | A1* | 2/2003 | Bhat et al. ..................... 709/105 |
| 2006/0274761 | A1* | 12/2006 | Error et al. .................... 370/396 |
| 2008/0077665 | A1* | 3/2008 | Sekaran et al. ............... 709/204 |
| 2010/0287171 | A1* | 11/2010 | Schneider ..................... 707/759 |
| 2011/0029498 | A1* | 2/2011 | Ferguson et al. ............. 707/703 |
| 2011/0307470 | A1* | 12/2011 | Kamimura et al. ........... 707/713 |
| 2011/0313984 | A1* | 12/2011 | Zhou et al. .................... 707/704 |

FOREIGN PATENT DOCUMENTS

| CN | 101169785 A | 4/2008 |
| CN | 201114128 Y | 9/2008 |

OTHER PUBLICATIONS

International Search Report for PCT/CN2010/073521 dated Aug. 13, 2010.

* cited by examiner

Primary Examiner — Robert Beausoliel, Jr.
Assistant Examiner — Richard Bowen
(74) Attorney, Agent, or Firm — Ling Wu; Stephen Yang; Ling and Yang Intellectual Property (57) ABSTRACT

Disclosed is a data query method, which includes: a client sending a client request to a query component agent; the query component agent selecting a query component according to a load balance principle and returning the query component to the client; and the query component processing the client request and returning a processing result to the client. Correspondingly, the present invention further provides a data query system and a method for constructing the same. The query component in the present invention does not have a logical uniqueness any more and has a high scalability, which allows dynamic addition of query components, thereby greatly improving the availability of the data query system.

18 Claims, 3 Drawing Sheets

DATA QUERY SYSTEM AND CONSTRUCTING METHOD THEREOF AND CORRESPONDING DATA QUERY METHOD

TECHNICAL FIELD

The present invention relates to the field of data query, and in particular, to a data query system and the method for constructing the same as well as a corresponding data query method.

BACKGROUND ART

In the construction of a data query system, especially in the construction of a performance data query system, or in the construction of a network server, it usually needs to receive many client requests sent by a client, wherein the client may be a Graphical User Interface (GUI) client or a Web client, and the requests of these clients often involve network transmission of large-scale data, and processing like logic calculation, merging and sequencing also needs to be performed on the returned data. For example, in a performance data query system, the collected performance data, after being processed, are stored into a performance report form, and in a data query system it usually needs to firstly query out performance data in a performance report that meet the conditions from a backstage database through a query component and then transmit these performance data back from the background via the network, and then the returned performance data, after some logic calculations, are encapsulated into a data structure suitable for GUI display; if the system is a distributed system, data from different data sources are also received and merged in the data query system, and are finally provided for GUI to display.

SUMMARY OF THE INVENTION

Currently the query component is generally in a directly construction way and has uniqueness logically, that is, one data query system has only one query component, and all client requests (including the client requests of the GUI client and the Web client) are processed in this query component, which will often cause failure of timely response of a service due to increase of request, thus decreasing the processing efficiency.

In addition, because of the uniqueness characteristic of the query component, the query component has neither expandability nor scalability, and is unable to improve the efficiency for processing requests by adding hardware devices, thus influencing the availability of the system itself.

The technical problem to be solved in the present invention is to provide a data query system and the method for constructing the same as well as a corresponding data query method, which ensure a high availability of the data query system.

In order to solve the above problem, the present invention provides a data query system, comprising a client, and the data query system further comprises a query component agent and one or more query components connected with the query component agent; wherein, the client is configured to send a client request to the query component agent, and receive a processing result of the query component;

the query component agent is configured to store a query component number of the query component, a query component instance and a client request load status of the query component, and update the stored client request load status of the query component according to a client request load status of the query component reported by the query component; and receive the client request, and select and return a query component to the client according to a load balance principle;

the query component is configured to send the query component number and the query component instance to the query component agent to register, and report the client request load status of the query component; and when the query component is the query component selected by the query component agent, process the client request and return the processing result to the client.

The client request load status is a number of client requests being processed on the query component, and the load balance principle is that the number of client requests being currently processed on the query component is minimum;

or, the client request load status is a processing weight of the client requests on the query component, and the load balance principle is that the processing weight of the client requests being currently processed on the query component is minimum.

The data query system further comprises a query component number distributer and a load balance controller; wherein, the query component number distributer is configured to distribute to the query component a unique query component number that is not occupied by other query components when the query component is started;

the load balance controller is configured to send a starting instruction to the query component to instruct the query component to start during a running process of the data query system.

The load balance controller is configured to send the starting instruction to the query component in the following way: sending the starting instruction to the query component according to a received control command of a user, or the load balance controller is further configured to set a starting threshold according to a running index of the data query system; and the load balance controller is configured to send the starting instruction to the query component in the following way: the load balance controller monitoring a running state of the data query system, and sending the starting instruction to the query component if the running index of the data query system reaches the starting threshold.

The running index of the data query system is one or more of a use scale of the data query system, responsiveness to the client requests, a number of the client requests, an amount of calculation of the client requests supported by the system, time consumption and occupied resources of a CPU for processing the requests.

In order to solve the above problem, the present invention further provides a method for constructing the above data query system, which specifically comprises the following steps:

starting a query component agent and starting one or more query components, the query component, after being started, sending a query component number and a query component instance to the query component agent to register and reporting a client request load status of the query component, and the query component agent storing mapping relationships between the query component number, the query component instance and a client request load status of the query component, and updating the stored client request load status according to a client request load status reported by the query component; and after receiving the client request, the query component agent selecting a query component based on a load balance principle, and returning the selected query component to a client, and the query component updating the client request load status of the query component.

Said step of starting one or more query components comprises starting all query components simultaneously when the data query system starts to run;

or, before the step of starting one or more query components, the method further comprises: configuring a load balance controller, which sets a starting threshold according to a running index of the data query system; and the step of starting one or more query components comprises: the load balance controller sending a starting instruction to the query component to instruct the query component to start during a running process of the data query system;

wherein, the load balance controller sends the starting instruction to the query component according to a received control command of a user, or the load balance controller monitors a running state of the data query system, and sends the starting instruction to the query component if the running index of the data query system reaches the starting threshold.

The running index of the data query system is one or more of a use scale of the data query system, responsiveness to the client requests, a number of the client requests, an amount of calculation of the client requests supported by the system, time consumption and occupied resources of a CPU for processing the requests.

The client request load status is a number of client requests being processed on the query component, and the load balance principle is that the number of client requests being currently processed on the query component is minimum;

or, the client request load status is a processing weight of the client requests on the query component, and the load balance principle is that the processing weight of the client requests being currently processed on the query component is minimum.

The step of the query component agent storing mapping relationships between the query component number, the query component instance and a client request load status of the query component comprises:

the query component agent initializing two Hash tables, wherein a first Hash table is used to store a mapping relationship between the query component number and the query component instance, and a second Hash table is used to store a mapping relationship between the query component number and the client request load status on the query component; and after receiving registration of the query component, the query component agent storing the mapping relationship between the query component number and the query component instance in the first Hash table;

the step of updating the stored client request load status according to a client request load status of the query component reported by the query component comprises: the query component agent receiving a periodic heartbeat connection of the query component and periodically updating the client request load status on the query component in the second Hash table.

After the step of selecting a query component, the method further comprises: the query component processing the client request, and returning a processing result to the client; before the step of the query component processing the client request, the step of the query component updating the client request load status comprises: adding one counting unit value to a count of the number of the client requests being currently processed on the query component; and before the step of the query component returning the processing result to the client, the step of the query component updating the client request load status further comprises: subtracting one of the counting unit value from the number of the client requests being currently processed on the query component.

The step of the query component sending the query component number and the query component instance to the query component agent to register, and reporting the client request load status of the query component comprises:

A, the query component starting a timer;

B, when a timing time is up, the query component judging whether the registration to the query component agent is successful or not, and if not, proceeding to step C; if yes, judging whether a heartbeat transmission of the client request load status to the query component agent last time is successful; if yes, proceeding to step D, otherwise proceeding to step C;

C, the query component registering to the query component agent, and returning to step B;

D, the query component sending the client request load status to the query component agent, and returning to step B.

In order to solve the above problem, the present invention further provides a data query method, comprising the following steps of:

a client sending a client request to a query component agent;

the query component agent selecting a query component according to a load balance principle and returning the query component to the client;

the query component processing the client request and returning a processing result to the client.

A client request load status is a number of client requests being processed on the query component, and the load balance principle is that the number of client requests being currently processed on the query component is minimum;

or, the client request load status is a processing weight of the client requests on the query component, and the load balance principle is that the processing weight of the client requests being currently processed on the query component is minimum.

The above data query system and data query method ensure a high availability of the data query system, and can overcome the defect in the existing data query system that a single query component cannot respond timely when the client requests increase.

PREFERRED EMBODIMENTS OF THE PRESENT INVENTION

The specific embodiments of the present invention will be described in detail below with reference to the drawings.

The data query system in this example comprises a client, a query component agent and one or more query components connected with the query component agent; wherein, the client is configured to send a client request to the query component agent;

the query component agent is configured to store a query component number of the query component, a query component instance and a client request load status of the query component, and update the stored client request load status of the query component according to a client request load status of the query component reported by the query component; and receive the client request, and select and return a query component to the client according to a load balance principle;

the query component is configured to send the query component number and the query component instance to the query component agent to register, and report the client request load status of the query component; and process the client request and return the processing result to the client.

The above data query system may further comprise a query component number distributer and a load balance controller; wherein, the query component number distributer is configured to distribute to the query component a unique query component number that is not occupied by other query components;

the load balance controller is configured to send a starting instruction to the query component to instruct the query component to start during a running process of the data query system according to the running index of the data query system or according to a received control command of the user;

wherein, the load balance controller may send the starting instruction to the query component according to a received control command of a user, or the load balance controller may set a starting threshold according to different running indexes of the data query system, monitors the running state of the data query system, and sends the starting instruction to the query component if the running index of the data query system reaches the starting threshold;

wherein, the running index of the data query system may be one or more of a use scale of the data query system, responsiveness to the client requests, a number of the client requests, an amount of calculation of the client requests supported by the system, time consumption and occupied resources of a CPU for processing the requests.

Based on the above data query system, this example provides a method for constructing the above data query system.

In this example, the original one query component is expanded into one or more query components, and a query component agent is established to manage the one or more query components; wherein, each query component can be configured to be able to process all types of client requests, and the types of client requests that can be processed by each query component are not limited;

the query component agent is also used to receive a client request, and select a query component according to a load balance principle and return the selected query component to the client sending the client request; as can be seen, the client request in this example is not directly sent to the query component.

The constructing method according to this example specifically comprises the following steps:

the first step: starting a query component agent and starting one or more query components, the query component, after being started, sending a query component number and a query component instance to the query component agent to register and reporting a client request load status of the query component, and the query component agent storing mapping relationships between the query component number, the query component instance and a client request load status of the query component, and updating the client request load status of the query component according to the report of the query component;

preferably, the query component periodically judges the status of registration to the query component agent, and periodically reports the client request load status for the query component agent to perform updating; in this way, the coupling between various parts of the system is smaller, and the fault-tolerance is better.

Of course, there may be other embodiments, for example, the query component performs judging once receiving one client request.

The step of the query component periodically judging the status of registration to the query component agent, and periodically reporting the client request load status for the query component agent to perform updating specifically comprises:

after a certain query component is started, the query component sending its query component number and query component instance to the query component agent, thereby registering to the query component agent; the query component agent receiving the registration of the query component, storing the mapping relationship between the query component number and the query component instance of the query component;

the query component agent managing one or more query components, and receiving the client requests; wherein, the management comprises: receiving the registration of a started query component, storing mapping relationships between the query component number, the query component instance and the client request load status of the query component, and updating the client request load status; wherein, the client request load status on the query component may be the number of client requests being processed on the query component, and may also be the processing weight of the client requests on the query component;

the query component agent selects a query component according to the client request load status, and finds a query component instance, thereby returning the query component represented by the query component instance to the client.

Figure 1:
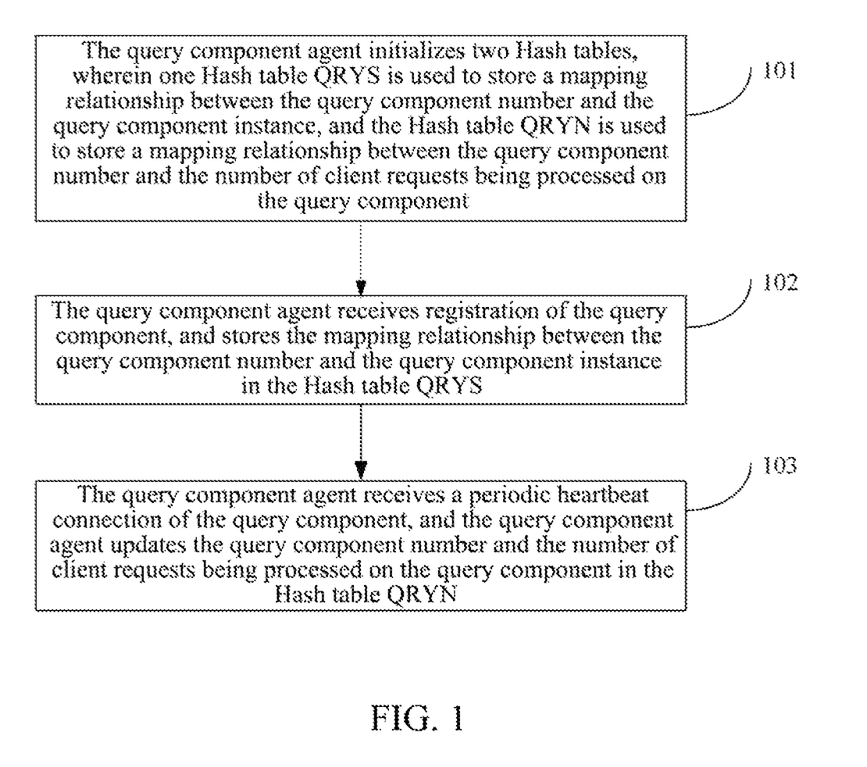
FIG. 1 is a flowchart of the query component agent storing and updating the mapping relationships after being started according to an example of the present invention.

FIG. 1 is a specific example of the query component agent storing and updating the mapping relationships after being started. In this example, the client request load status on the query component is the number of client requests being processed on the query component, and the following steps are included specifically.

In step 101, the query component agent initializes two Hash tables, wherein one Hash table QRYS is used to store a mapping relationship between the query component number and the query component instance, and another Hash table QRYN is used to store a mapping relationship between the query component number and the number of client requests being processed on the query component;

in another example, the mapping relationships between the query component number, the query component instance and the requests being currently processed on each query component may be stored in one table.

In step 102, the query component agent receives registration of the query component, and stores the mapping relationship between the query component number and the query component instance in the Hash table QRYS.

In step 103, the query component agent receives a periodic heartbeat connection of the query component, the query component delivers the query component number and the number of client requests being processed on the query component to the query component agent as parameters, and the query component agent updates the query component number and the number of client requests being processed on the query component in the Hash table QRYN.

In this step, there may be many embodiments: the query component agent may periodically updates the query component number and the number of client requests being processed on the query component in the Hash table QRYN; or updates in real time, or the query component agent instructs, as needed, the query component to send the number of client requests that are being processed.

In the first step, there may be also many embodiments for starting the query component:

for example, all query components are started simultaneously when the data query system starts to run;

or, a load balance controller dynamically starts the query components during the running process according to a running index of the data query system or according to a received control command of a user, and each query component is independently started; wherein, the load balance controller is used to send a starting instruction to the query component to instruct the query component to start;

furthermore, the load balance controller may send the starting instruction to the query component according to a received control command of a user, and the load balance controller may also set a starting threshold according to different running indexes of the data query system, and monitors a running state of the data query system, and sends the starting instruction to the query component if the running index of the data query system reaches the starting threshold;

wherein, the running index of the data query system may be one or more of a use scale of the data query system, responsiveness to the client requests, the number of the client requests, an amount of calculation of the client requests supported by the system, time consumption and occupied resources of a CPU for processing the requests.

Figure 2:
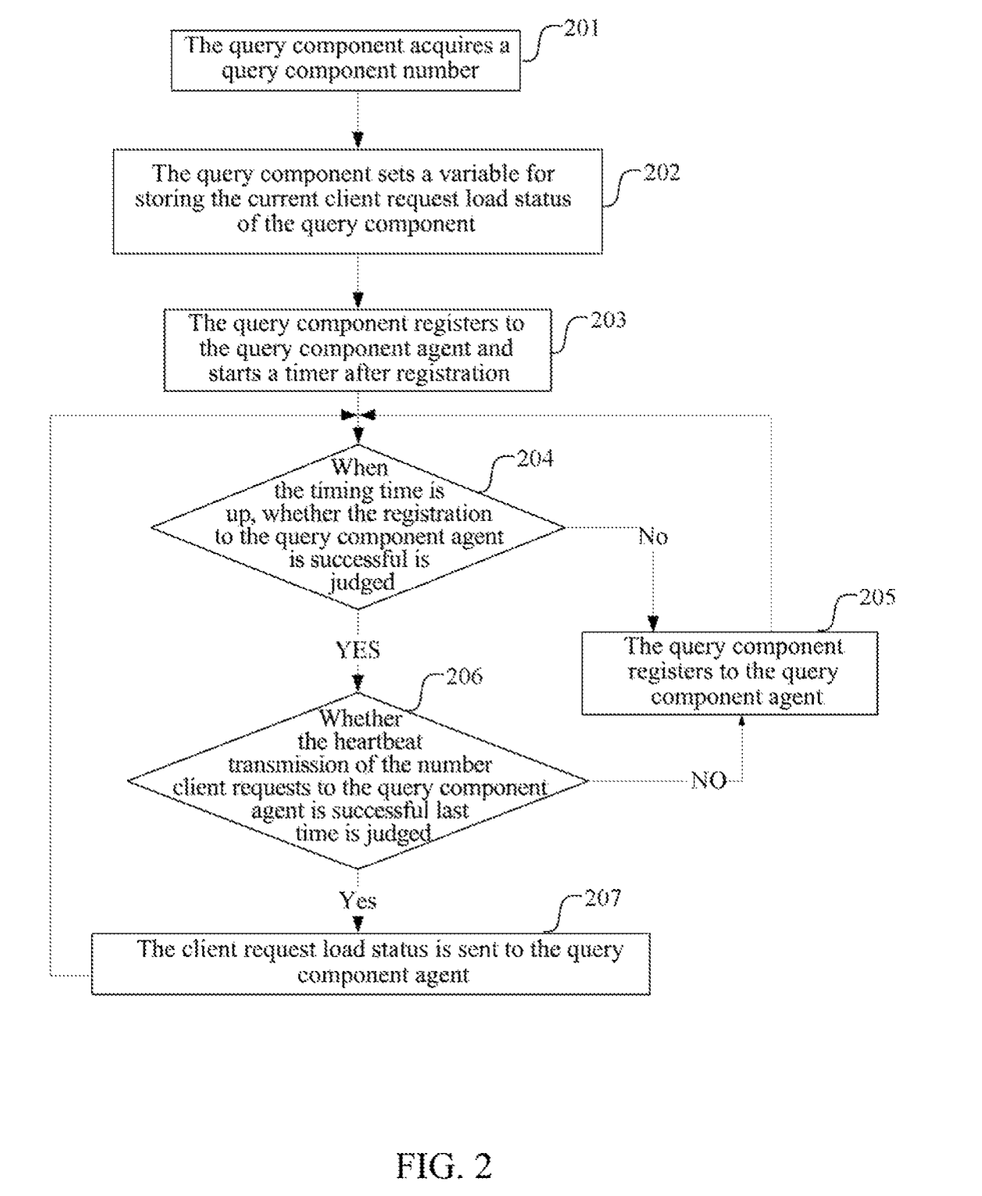
FIG. 2 is a flowchart of the query component dynamically starting, and registering and reporting the query component number and client request load status according to an example of the present invention.

FIG. 2 is a preferred example of dynamically starting the query component, and registering and reporting the query component number and client request load status, which specifically comprises the following steps.

In step 201, the query component acquires a query component number that is not occupied by other query components.

Wherein, the query component number may be distributed to the query component by a query component number distributer;

this query component number distributer is configured to distribute to the query component a unique query component number that is not occupied by other query components;

of course, the query component number may also be pre-configured in the query component, in which case, step 201 may be omitted.

In step 202, the query component sets a variable for storing the current client request load status of the query component, for example, the number of client requests being processed.

In step 203, the query component starts a timer.

Wherein, the timing time of the timer may be set according to the actual running of the data query system, and will not be limited in the present invention.

In addition, furthermore in this step, a variable 1 for indicating whether the registration is successful and a variable 2 for indicating whether the client request load status is successfully sent to the query component agent last time may be initialized; however, the present invention is not limited to this method for defining whether the registration is successful and whether the client request load status is successfully sent, for example, the query component may also be informed of whether being successful through interaction with the query component agent.

Wherein, the variable 1 and variable 2 may be boolean variables, with True indicating success and False indicating failure, and of course, they may also be other variables.

In step 204, when the timing time is up, the query component judges whether the registration to the query component agent is successful or not, and if not, proceed to step 205; if yes, proceed to step 206.

For example, judgment made by made according to the value of the variable 1.

In step 205, the query component registers to the query component agent, and return to step 204.

If the mode of setting the variable 1 is adopted, this step may further comprises setting the value of the variable 1 according to the result about whether registration is successful; for example, when the registration is successful, the variable 1 represented by the boolean variable is set as True, otherwise, it is set as False.

In step 206, whether the heartbeat transmission of the client request load status (e.g. the number of client requests) to the query component agent is successful last time is judged; if yes, proceed to step 207, otherwise proceed to step 205.

For example, judgment made by made according to the value of the variable 2.

In step 207, the client request load status, for example the number of client requests that are being processed, is sent to the query component agent; return to step 204.

If the way of setting the variable 2 is adopted, this step further comprises setting the value of the variable 2 according to the result about whether the client request load status is successfully sent to the query component agent.

Of course, registration and reporting of non-dynamic starting may also adopt the embodiment of this example.

In the above preferred example, the query component maintains the connection between the query component and the query component agent in a method of broken-point continual connection, that is, the query component registers upon starting and periodically sends the current number of client request to the query component agent. Especially in a distributed system, different client requests are often distributed to different data sources or backgrounds to process, and these client requests do not possess relevance with each other per se, but if they are to be processed by the same one query component, they will influence each other. This scheme will reduce the unnecessary coupling between them as much as possible.

In the second step, after receiving the client request, the query component agent selects a query component according to a load balance principle and returns it to the client.

Wherein, there are many kinds of load balance principles, for example: it may be that every time a demand of the client for acquiring a query component is received, a query component with the minimum number of client requests currently being processed is selected and returned to the client; or it may be done according to the processing weight of the client request and a query component with the minimum current processing weight is returned to the client.

Wherein, processing weight is the responsiveness of the system to the client request; for example, the larger the amount of the data is, the larger the influence on the responsiveness is; therefore, when a query component is selected according to the processing weight of the client request, it may be implemented in one or more of the following way: a query component with the minimum amount of calculation of the client requests currently being processed is returned to the client, or a query component with the minimum CPU time consumption for processing the client request currently is selected;

therefore, when the client request load status is the number of the client requests being currently processed on the query component, the load balance principle is that the number of the client requests being currently processed on the query component is the minimum;

or, when the client request load status is the processing weight of the client requests on the query component, the load balance principle is that the processing weight of the client requests being currently processed on the query component is the minimum.

Figure 3:
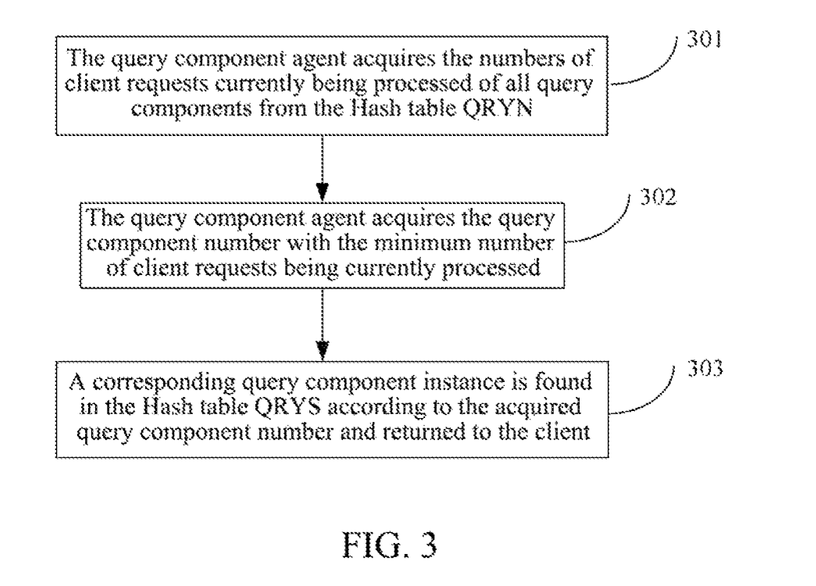
FIG. 3 is a flowchart of the query component agent acquiring a query component according to a load balance principle according to an example of the present invention.

FIG. 3 is an example of the query component agent acquiring a query component according to a load balance principle, which comprises the following steps.

In step 301, the query component agent acquires the numbers of client requests currently being processed of all query components from the Hash table QRYN.

In step 302, the query component agent acquires the query component number with the minimum number of client requests currently being processed, and if there is more than one query component numbers with the minimum number of client requests, one of them is selected randomly, and of course there may be other embodiments, for example, the minimum query component number is selected.

In step 303, a corresponding query component instance is found in the Hash table QRYS according to the acquired query component number and returned to the client.

In step three, the query component updates the client request load status of the query component.

If the client request load status is the number of the client requests currently being processed, this step may be specifically that: before the query component processes the client request, a unit counting value, for example 1, is added to the count of the requests of the query component, while before a processing result is returned to the client, the same unit counting value is subtracted from the count of the number of the client requests currently being processed on the query component;

if the client request load status is the processing weight of the client requests, the query component calculates the processing weighing of the current client requests and performs updating.

In the present invention, since the requirements of the system can be met by dynamically adding query components, the system has a good dynamic expansibility. This scheme per se can also be extended to be applied to any application requiring a high expansibility, which may be specifically a Management Information System (MIS), an information query system, a performance data query system, especially the performance data query system on network management, etc.

Figure 4:
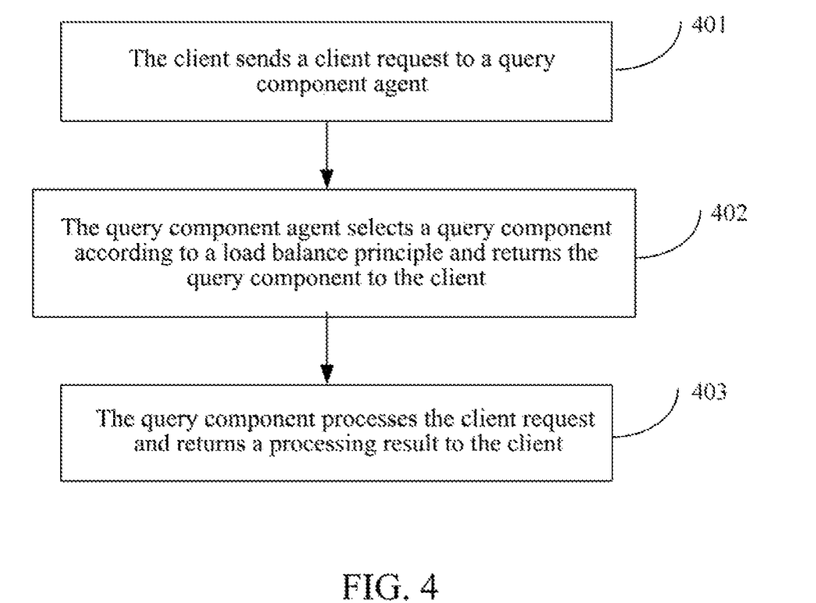
FIG. 4 is a flowchart of the data query method according to an example of the present invention.

Correspondingly, this example also provides a data query method based on the above data query system. As shown in FIG. 4, the method specifically comprises the following steps.

In step 401, the client sends a client request to a query component agent;

in step 402, the query component agent selects a query component according to a load balance principle and returns the query component to the client; and in step 403, the query component processes the client request and returns a processing result to the client.

INDUSTRIAL APPLICABILITY

Compared with the traditional scheme of querying with a single component and collectively processing query requests, in the scheme of the present invention, each query component has an equal processing ability, that is, the query component does not have a logical uniqueness any longer. Selection of the query component is performed by a query component agent such that the query component has a high scalability. When there are so many query requests that the existing query components cannot process them efficiently, query components can be dynamically added, and the newly added query components can be deployed on other machines so as to promoting the responding capability by adding hardware devices without influencing the client requests being currently processed, thereby significantly improving the availability of the data query system.

What is claimed is:

1. A data query system comprising a client, a query component agent and one or more query components connected to the query component agent; wherein, the client is configured to send a client request to the query component agent, and directly receive a processing result from the query component;

the query component agent is configured to:
store a relation among a query component number, a query component instance, and a client request load status of the query component, and update the stored client request load status of the query component according to a client request load status of the query component reported by the query component, and receive the client request;

when the query component agent receives the client request, select a query component to process the client request based on a load balance rule and the stored relation information, and further find the query component instance of the query component, and return the query component instance to the client;

the query component is configured to send the query component number and the query component instance to the query component agent to register and report the client request load status of the query component; and when the query component is the query component selected by the query component agent, process the client request and directly return the processing result to the client;

wherein the relation among the query component number, the query component instance, and the client request load status of the query component is stored by:
initializing two Hash tables, wherein a first Hash table stores a mapping relationship between the component number and the query component instance, and a second Hash table stores a mapping relationship between the query component number and the client request load status on the query component;

after receiving registration of the query component, storing the mapping relationship between the query component number and the query component instance in the first Hash table;

wherein updating the stored client request load status includes: receiving a periodic heartbeat connection of the query component and periodically updating the client request load status on the query component in the second Hash table.

2. The data query system of claim 1, wherein,
the client request load status is a number of client request being processed on the query component, and the load balance rule is that the number of the client request being currently processed on the query component is minimum;

or, the client request load status is a processing weight of the client request on the query component, and the load balance rule is that the processing weight of the client request being currently processed on the query component is minimum.

3. The data query system of claim 2, wherein, the data query system further comprises a query component number distributer and a load balance controller;
wherein,
the query component number distributer is configured to distribute to the query component a unique query component number that is not occupied by other query components when the query component is started;
the load balance controller is configured to send a starting instruction to the query component to instruct the query component to start during a running process of the data query system.

4. The data query system of claim 3, wherein,
the load balance controller is configured to send the starting instruction to the query component in the following way: sending the starting instruction to the query component according to a received control command of a user, or
the load balance controller is further configured to set a starting threshold according to a running index of the data query system; and the load balance controller is configured to send the starting instruction to the query component in the following way: the load balance controller monitoring a running state of the data query system, and sending the starting instruction to the query component if the running index of the data query system reaches the starting threshold.

5. The data query system of claim 4, wherein,
the running index of the data query system is one or more of a use scale of the data query system, responsiveness to the client request, a number of the client request, an amount of calculation of the client request supported by the system, time consumption and occupied resources of a CPU for processing the request.

6. The data query system of claim 1, wherein, the data query system further comprises a query component number distributer and a load balance controller; wherein,
the query component number distributer is configured to distribute to the query component a unique query component number that is not occupied by other query components when the query component is started;
the load balance controller is configured to send a starting instruction to the query component to instruct the query component to start during a running process of the data query system.

7. The data query system of claim 6, wherein,
the load balance controller is configured to send the starting instruction to the query component in the following way: sending the starting instruction to the query component according to a received control command of a user, or
the load balance controller is further configured to set a starting threshold according to a running index of the data query system; and the load balance controller is configured to send the starting instruction to the query component in the following way: the load balance controller monitoring a running state of the data query system, and sending the starting instruction to the query component if the running index of the data query system reaches the starting threshold.

8. The data query system of claim 7, wherein,
the running index of the data query system is one or more of a use scale of the data query system, responsiveness to the client request, a number of the client request, an amount of calculation of the client request supported by the system, time consumption and occupied resources of a CPU for processing the request.

9. A method for constructing a data query system, comprising:
starting a query component agent and starting one or more query components,
sending a query component number and a query component instance, by the query component, to the query component agent
registering and reporting, at the query component agent, a client request load status of the query component, and
storing, at the query component agent, a mapping relationship among the query component number, the query component instance and the client request load status of the query component, and updating the stored client request load status according to the client request load status reported by the query component; and
after receiving a client request, selecting, by the query component agent, the query component to process the client request based on a load balance rule and the stored relationship information, finding the query component instance of the query component, returning the query component instance to the client, and updating, at the query component, the client request load status of the query component;
wherein storing the mapping relationship among the query component number, the query component instance and the client request load status of the query component includes:
initializing two Hash tables, at the query component agent, wherein a first Hash table stores a mapping relationship between the query component number and the query component instance, and a second Hash table stores a mapping relationship between the query component number and the client request load status on the query component;
after receiving registration of the query component, storing, at the query component agent, the mapping relationship between the query component number and the query component instance in the first Hash table; and
wherein updating the stored client request load status according to the client request load status of the query component reported by the query component includes: receiving, at the query component agent, a periodic heartbeat connection of the query component and periodically updating the client request load status on the query component in the second Hash table.

10. The method of claim 9, wherein,
said step of starting one or more query components comprises starting all query components simultaneously when the data query system starts to run;
or,
before the step of starting one or more query components, the method further comprises: configuring a load balance controller, which sets a starting threshold according to a running index of the data query system; and the step of starting one or more query components comprises: the load balance controller sending a starting instruction to the query component to instruct the query component to start during a running process of the data query system;
wherein, the load balance controller sends the starting instruction to the query component according to a received control command of a user, or the load balance controller monitors a running state of the data query system, and sends the starting instruction to the query component if the running index of the data query system reaches the starting threshold.

11. The method of claim 10, wherein, the running index of the data query system is one or more of a use scale of the data query system, responsiveness to the client request, a number of the client request, an amount of calculation of the client request supported by the system, time consumption and occupied resources of a CPU for processing the request.

12. The method of claim 11, wherein, the client request load status is a number of client request being processed on the query component, and the load balance rule is that the number of client request being currently processed on the query component is minimum;

or, the client request load status is a processing weight of the client request on the query component, and the load balance rule is that the processing weight of the client request being currently processed on the query component is minimum.

13. The method of claim 10, wherein, the client request load status is a number of the client request being processed on the query component, and the load balance rule is that the number of client request being currently processed on the query component is minimum;

or, the client request load status is a processing weight of the client request on the query component, and the load balance rule is that the processing weight of the client request being currently processed on the query component is minimum.

14. The method of claim 9, wherein, the client request load status is a number of the client request being processed on the query component, and the load balance rule is that the number of the client request being currently processed on the query component is minimum;

or, the client request load status is a processing weight of the client request on the query component, and the load balance rule is that the processing weight of the client request being currently processed on the query component is minimum.

15. The method of claim 14, wherein, after the step of selecting a query component, the method further comprises: the query component processing the client request, and directly returning a processing result to the client;

before the step of the query component processing the client request, the step of the query component updating the client request load status comprises: adding one counting unit value to a count of the number of the client request being currently processed on the query component; and before the step of the query component directly returning the processing result to the client, the step of the query component updating the client request load status further comprises: subtracting one of the counting unit value from the number of the client request being currently processed on the query component.

16. The method of claim 9, wherein, the step of the query component sending the query component number and the query component instance to the query component agent to register, and reporting the client request load status of the query component comprises:

A, the query component starting a timer;

B, when a predetermined time period is up, the query component judging whether the registration to the query component agent is successful or not, and if not, proceeding to step C; if yes, judging whether a heartbeat transmission of the client request load status to the query component agent last time is successful; if yes, proceeding to step D, otherwise proceeding to step C;

C, the query component registering to the query component agent, and returning to step B;

D, the query component sending the client request load status to the query component agent, and returning to step B.

17. A data query method, comprising:

starting a query component agent and starting one or more query components by the query component agent, sending a query component number and a query component instance, by the query component, to the query component agent registering and reporting, at the query component agent, a client request load status of the query component, and storing, at the query component agent, a mapping relationship among the query component number, the query component instance and the client request load status of the query component, and updating the stored client request load status according to the client request load status reported by the query component; and sending, from a client, a client request to the query component agent;

selecting, by the query component agent, the query component to process the client request according to a load balance rule, finding the query component instance of the query component, and returning the query component instance to the client;

processing, by the query component, the client request and directly returning a processing result to the client;

wherein storing the mapping relationship among the query component number, the query component instance and the client request load status of the query component includes:

initializing two Hash tables, at the query component agent, wherein a first Hash table stores a mapping relationship between the query component number and the query component instance, and a second Hash table stores a mapping relationship between the query component number and the client request load status on the query component;

after receiving registration of the query component, storing, at the query component agent, the mapping relationship between the query component number and the query component instance in the first Hash table; and receiving, at the query component agent, a periodic heartbeat connection of the query component and periodically updating the client request load status on the query component in the second Hash table.

18. The data query method of claim 17, wherein, a client request load status is a number of the client request being processed on the query component, and the load balance rule is that the number of the client request being currently processed on the query component is minimum;

or, the client request load status is a processing weight of the client request on the query component, and the load balance rule is that the processing weight of the client request being currently processed on the query component is minimum.

* * * * *